Patented Apr. 14, 1936

2,037,323

UNITED STATES PATENT OFFICE 2,037,323

PIGMENTS AND FILM-FORMING COMPOSITIONS CONTAINING THE SAME

Henry A. Gardner, Washington, D. C.

No Drawing. Application March 4, 1935,
Serial No. 9,348

11 Claims. (Cl. 134—58)

The present invention relates to pigments adapted for use in making film-forming coating compositions such as paints, enamels (i. e., pigmented varnishes), and pigmented lacquers, and to the provision of composite pigments or pigmenting agents for such use, and is concerned more particularly with the provision of such pigmented film-forming coating compositions containing as all or a part of the pigment content thereof a metallic salt of phthalic acid, maleic acid, or, in general, a metallic salt of an organic polybasic acid.

It is, of course, known that clear film-forming compositions may be prepared by dissolving phthalic acid compounds of glycerin, with or without the addition of suitable plasticizers, in suitable solvents, and that such clear solutions may be pigmented whereby to yield opaque protective coatings. These phthalic acid glycerides dry to a very pronounced hardness, and are durable under certain conditions.

However, metallic phthalates in the form of opaque, relatively insoluble pigments, heretofore have not been utilized by the industry. Relatively insoluble pigments comprising metallic phthalates as the opacifying solid pigment of a coating composition are distinct from the use of a solution of phthalic acid glyceride, which latter is the only form in which phthalic acid heretofore has been employed in this industry.

I have found that such metal salts of phthalic acid as are relatively insoluble in water and in commonly encountered organic solvents may be incorporated in oil paints, in varnishes, or in cellulosic lacquers giving good hiding power and color to the resulting compositions. I have found that the relatively water-insoluble metallic phthalates may be ground to a fineness suitable in pigments adapted for use in film-forming compositions; that they prove to be durable upon weathering under trying conditions; and are stable. Certain metallic phthalates including especially lead phthalate I also have found to be adapted for use as constituents of vitreous enamel fluxes (replacing litharge); also, for use as constituents of rubber mixes (replacing litharge or white lead).

I have prepared a number of pigmentary metallic salts of organic polybasic acids, and in general they may be prepared by the following illustrative method: phthalic anhydride is dissolved in water, and silver carbonate is added gradually. The mass effervesces as the carbon dioxide is expelled. After washing and drying, a white silver phthalate is formed, containing about 56% of silver. In a similar manner, a barium phthalate may be prepared which is brilliantly white and dense, containing about 51% of barium oxide. In a similar manner, a mercury phthalate may be prepared which contains approximately 52% of mercury. This product also is a very dense white pigment. Similarly, a pigment may be produced by adding copper carbonate to phthalate anhydride water solution. After washing and drying, a greenish colored pigment is produced, which contains about 32% of CuO. Many other metallic phthalates, including the phthalates of titanium, thorium, iron and nickel, have been prepared by like methods. Two which gave interesting results in my paint experiments were prepared by the following methods:

Example A

Dissolve 44 grams of phthalic anhydride in 2 liters of boiling water. Perfect solution should be obtained. Gradually and slowly add 77 grams of basic carbonate of lead. Great effervescence will be noticed since the phthalic anhydride, acting as an acid, will drive off the carbon dioxide from the basic carbonate of lead and immediately form lead phthalate. After the reaction has been completed, which generally requires about 15 or 20 minutes, the mass is washed, pressed and dried. A finely divided, white powder results.

Example B

Dissolve 152 grams of lead acetate crystals (sugar of lead) in 1000 cc. of water. Then separately dissolve 60 grams of phthalic anhydride in 2000 cc. of boiling water. Add this latter solution to the previous solution, stirring rapidly. A dense white precipitate of lead phthalate forms immediately. The phthalic anhydride is completely precipitated by the lead acetate. Wash by decantation, filter-press, and dry. A dense, white pigment results. This pigment is more fluffy and requires a greater amount of linseed oil to form a paint than the lead phthalate made in Example A.

The invention includes the concept of preparing useful opaque film-forming compositions from such metallic phthalates—either as the sole or main pigment constituent thereof or in the form of a composite pigment obtained by coating a metallic phthalate over the surfaces of particles of another pigment. Such composite pigments may be prepared by, for instance, precipitating the desired metallic phthalate, in the presence of finely divided pigment, and in liquid medium.

In one embodiment, the present invention consists of a dispersion of a white pigment comprising, or consisting essentially of, lead phthalate in a film-forming coating composition of one or another of the types above mentioned. Lead phthalate is a particularly dense, brilliantly white, body which is practically insoluble in water and in the usual organic solvents: it may be ground in oil or varnish or lacquer to a desirable dispersion thereof, and such dispersions have been found to dry hard and to weather very satisfactorily. However, the invention includes the employment in the relation stated of such other metal phthalates as are relatively water-insoluble, including phthalates of copper, lithium, cobalt, mercury, titanium, cadmium, barium, silver, manganese and iron. Certain of these metal phthalates are colored (e. g., brown in the case of the iron salt, green-blue in the case of the copper salt, flesh color in the case of the manganese salt, etc.), and yield correspondingly colored dispersions. Where water-solubility is of minor importance, other metallic phthalate such as the phthalates of nickel, thorium, zinc, uranium, beryllium, cerium and the like, may be employed, but I prefer to employ in the present relation the relatively insoluble salts aforesaid.

A useful composite pigment comprising a metallic phthalate may be produced by reacting phthalic acid or its salts, such as sodium phthalate in aqueous solution with a reactive compound of the desired metal (e. g., with silver carbonate or basic lead carbonate, or with a solution of lead acetate, or with a reactive compound of another metal such, for instance, as a reactive salt of titanium, (e. g., titanium sulphate), in the presence of at least one other opaque pigment such, for instance, as white lead, zinc oxide, lithopone, titanium oxide, a titanium oxide-containing mixed pigment, or the like, in such proportions as to yield a composite comprising a major proportion (e. g., 90 to 50%) of the second pigment, and a minor proportion (e. g., 10 to 50%, and preferably 40% or less) of the phthalate salt coating the particles of the second pigment. Thus, I may coat with a white phthalic acid metal salt (e. g., lead or silver phthalate) the surfaces of individual particles of a white pigment (e. g., lithopone), whereby to yield a white composite pigment having desirable properties. Of course, other metallic salts of phthalic acid similarly may be coated over the surfaces of individual particles of another pigment.

The invention will be described in further detail with reference to the following illustrative examples:

Example I

A good house paint of white color was prepared by grinding lead phthalate in linseed oil, in about the proportions of 60 parts by weight of the salt to about 30 parts by weight of the oil, 5 parts by weight each of turpentine and of the usual drier solution of lead and manganese linoleates being added.

The linseed oil, solvent diluent and drier of the foregoing example may be substituted by their known equivalents. Thus, for linseed oil there may be substituted perilla oil or mixtures of heat-treated tung oil and fish oil, or synthetic resin solutions or varnishes made therefrom.

The lead phthalate of the above example may be substituted in whole or in part by another metallic phthalate salt. Also the lead phthalate of the foregoing example may, with good results, be replaced by a corresponding or suitable amount of a composite pigment comprising zinc oxide pigment the surfaces of the individual particles of which carry a coating of a white metallic phthalate such as lead phthalate

Example II 30 parts by weight of copper phthalate were ground in 70 parts by weight of a solution of shellac, in alcohol, of freely brushable consistency. The resulting product was a good toxic anti-fouling paint of a greenish color.

Mercury phthalate may be substituted in whole or in part for the copper phthalate of the above described toxic anti-fouling paint with good results. Tubularia, ascidians, barnacles and other fouling media are discouraged when copper or mercury phthalates are employed in ships' hulls paints.

Relatively insoluble metal phthalates may similarly be incorporated in oil varnishes, yielding pigmented varnishes or enamels of good hiding power and durability.

Example III

A synthetic resin varnish was prepared by cooking together 100 grams of a phenol-formaldehyde resin and 200 grams of tung oil until proper body had been obtained. This was thinned with 300 grams of turpentine and a small amount of drier was added. Into the 600 grams of the resulting synthetic resin varnish there was ground in a pebble mill, for a period of about 8 hours, 600 grams of lead phthalate pigment. A white, quick-drying film-forming material results.

Example IV 10 parts of finely subdivided titanium phthalate pigment were dispersed in about 90 parts by weight of a clear lacquer consisting of 10 parts of cellulose acetate dissolved in 20 parts by weight of ethylene glycol monoethyl ether acetate and 60 parts of acetone or other ketones, the solution containing about 10 parts by weight of dimethyl phthalate plasticizer. The resulting product was a white lacquer having good resistance to weathering.

The substitution of lead phthalate for the titanium salt of the foregoing example yields a white lacquer of valuable properties from the standpoint of hiding power, weathering, and true whiteness. If a colored lacquer is required, copper phthalate or other colored phthalate metal salt may be substituted for part or all of the titanium or lead salt aforesaid.

The lacquer may comprise another ester of cellulose than the acetate, or an ether of cellulose, known to yield desirable lacquers; and the liquid ingredients of the lacquer may be such other solvents and plasticizers as already are known to be adapted for use in preparing cellulosic lacquers.

The pigment described in Example IV above, titanium phthalate, is, as prepared, a finely divided, opaque white solid of good hiding power, and answers the general criteria of a commercial pigment. I have found that as titanium phthalate is deprived of contained water it loses opaqueness, and that when it is thoroughly dried (as by ovening at a temperature slightly above the boiling point of water, say, at 105° C., for several hours), it is a horny, transparent to translucent, friable material of little covering power: in powdered form it has the physical appearance of powdered hide glue or resin. It is, however, relatively insoluble in water and almost all organic solvents.

Completely dry titanium phthalate is, then, not per se a commercial opaque pigment. However, I have found that it has certain unpredictable and very desirable effects when carried by another pigment; that is to say, in a composite pigment. Thus, I have found that by precipitating titanium phthalate in the presence of a pigment known to have "chalking" properties when embodied in paints, in suspension in a liquid medium, separating the resulting composite from the medium, and drying the composite, I am able to produce a pigmentary product having the same or substantially the same color as that of the original "chalking" pigment but distinguished from the latter by a greatly reduced "chalking" tendency, greater durability, and reduced tendency to color failure when tinted. The base pigment may be titanium oxide, or a commercially known mixed pigment consisting of about three parts of titanium oxide and one part of barium sulphate, or lithopone, or lead chromate, or other white or colored pigment. This property of the titanium phthalate may be due to some "adhesive" relation between the said salt and the base pigment; or, it may be due to other physical phenomena. While I offer no explanation of these phenomena, I can state that they obtain. Film-forming coating compositions comprising organic binding media (e. g., drying or semi-drying oils; oil, or spirit, solutions of natural or synthetic resins; etc.) and pigments surface treated with a minor proportion of titanium phthalate show enhanced durability; any "chalking" tendency on the part of the base pigment is retarded, as is tendency to color failure. Illustrative of such film-forming compositions is a paint composed of 50 parts of titanium phthalate-treated titanium oxide, 40 parts of linseed oil and 10 parts of turpentine and drier; or 30 parts of the same pigment ground in 70 parts of a tung oil spar varnish containing a modified phenol-formaldehyde resin; or 25 parts of the same pigment, ground in an alkyd resin varnish.

So-called rare metals of the third group, such as zirconium and titanium, when in combination with benzene dicarboxylic acids, such as phthalic acid, are, in so far as I am aware, new compounds. In the following example is given an operable method by which titanium phthalate may be prepared:

Example V 2 molecular parts of phthalic acid anhydride are dissolved in boiling water, and there is gradually added 4 molecular parts of caustic soda. According to this, 296 parts by weight of phthalic acid anhydride require 160 parts by weight of caustic soda to form a practically neutral salt. A neutral salt of this character is necessary for the best results.

1 molecule of titanium oxide (molecular weight 80) in the form of an aqueous solution of a reactive salt of titanium requires 2 molecules of phthalic acid anhydride (molecular weight 296) to produce titanium phthalate (molecular weight 376).

It is highly essential that the reactive salt of titanium, e. g., titanium sulphate, used for this purpose be first partially neutralized to bring it to a point where there is no great quantity of free acid, e. g., sulphuric acid. For this purpose the titanium sulphate solution is gradually treated with dilute caustic soda until one has reached just about the point of precipitation. When any flakes of titanium hydrate are formed, they are brought back into solution with a trace of sulphuric acid.

An amount of titanium sulphate solution equivalent to one mol. of titanium oxide and the sodium phthalate solution, equivalent to 2 mols. of phthalic acid anhydride, is gradually added. A beautiful white pigment is precipitated. It is extremely fine, almost colloidal in appearance. After washing, filtering and drying at 105° C. overnight, the white appearance gradually fades out and there is left a rather amber colored mass which is extremely hard but friable. Titanium phthalate theoretically contains approximately 21% of titanium oxide, but if any hydrolysis takes place during precipitation, the percentage of titanium present would be raised to some extent. As will be obvious, the polybasic acid salts involved in the present invention yield, upon treatment with a saponification substance, the metal compounds and acids from which they were formed; thus, the saponification products of titanium phthalate may be sodium phthalate and titanium hydroxide, oxide or other titanium compound. Heating a titanium phthalate pigment with a strong alkali or base may yield vapors of phthalic anhydride or in some instances, carbonic dioxide, benzoic acid or benzene.

It is to be observed that the titanium phthalate pigment used in Example IV above was an incompletely dried product.

As an illustration of my process of treating known pigments with titanium phthalate the following is given:

Example VI 2000 grams of a titanium oxide-containing pigment, such as titanium oxide, or a mixed pigment consisting of 3 parts by weight of titanium oxide and 1 part by weight of barium sulphate, is placed in a large container, together with 10,000 grams of water. There is then poured onto the mass 1,000 grams of titanium sulphate solution containing 42.5 grams of titanium oxide as sulphate. A small amount of caustic soda had previously been added to the titanium sulphate solution to bring it approximately to the point of neutrality but leaving it slightly acid. Then there is prepared as a separate solution 160 grams of phthalic acid anhydride (this being a slight excess) dissolved in 3,000 grams of water, there being added to this 87 grams of caustic soda to bring it to a neutral solution and to form sodium phthalate. This solution is then gradually poured into the first container containing the titanium oxide pigment, water, and titanium sulphate. Immediately, titanium phthalate is precipitated onto the surfaces of the titanium pigment particles. Approximately 200 grams of titanium phthalate is thus precipitated on the 2,000 grams of white titanium pigment. After thorough agitation and washing, the 2,200 grams of coated pigment is filtered and dried. It is heated to only 105° C. for drying. The material is then pulverized and is ready to use in paint.

Example VII

The above example can be repeated, using the same amounts of reactants and the same or similar proportions between titanium phthalate and pigment, but substituting another pigment, e. g., a colored pigment such as lead chromate, for the titanium pigment base. When the resulting composite pigment, or treated pigment, is thoroughly dried it is found to have the same, or substantially the same, color effect as that of the pigment base, but is more durable, and is less subject to chalking and color failure than is the pigment base per se.

While in the two preceding examples there has been described the association of exactly 10% by weight of titanium phthalate with 90% of pigment base, it is to be understood that these proportions may be varied within reasonable limits, it being the crux of this embodiment of the invention to associate with the base pigment a relatively small (i. e., minor) amount of the titanium phthalate.

Moreover, in the foregoing Examples I, II, III, and IV the relative proportions are not to be considered as being critical, since it will be appreciated by those skilled in this art that reasonable variation in the proportions is contemplated.

Finally, it is to be appreciated that in the foregoing examples the phthalic acid of the metallic salts may occasionally be substituted by maleic acid or other benzene dicarboxylic acid, but my experience has been that most of the latter are not as satisfactory for pigments since the metallic maleates, for instance, appear to be much more water soluble than are the corresponding phthalates.

This application contains subject matter in common with my application Serial No. 727,201, filed May 23, 1934.

I claim:

1. As a pigment, a subdivided pigmentary product comprising titanium phthalate.

2. A pigmentary composition consisting essentially of particles of a pigment carrying on their surfaces finely subdivided titanium phthalate in minor proportion.

3. A composite pigment consisting essentially of from about 10% to 50% of titanium phthalate and from about 90% to 50% of another pigment.

4. A composite pigment consisting essentially of from about 10% to about 40% of titanium phthalate and from about 90% to about 60% of another pigment.

5. An opaque film-forming coating composition comprising an organic binding medium in which are dispersed particles of a subdivided pigmentary product comprising titanium phthalate.

6. An opaque film-forming coating composition comprising an organic binding medium in which are dispersed particles of a composite pigment consisting essentially of from about 10% to 50% of titanium phthalate and from about 90% to 50% of another pigment.

7. A coating composition as defined in claim 5, in which the organic binding medium comprises a cellulose derivative.

8. A pigmentary composition consisting essentially of particles of a titanium pigment carrying on their surfaces a deposit of titanium phthalate in minor proportion.

9. Process which comprises reacting in aqueous solution a salt of phthalic acid with a reactive salt of titanium, in the presence of dispersed particles of a solid pigment, and separating solids from liquid in the reaction mixture.

10. Process as defined in claim 9, in which the solid pigment comprises titanium oxide, the solid pigment being present in major proportion as compared with the amount of the precipitate.

11. Process which comprises precipitating titanium phthalate in relatively small amount in the presence of particles of a pigment, and drying the resulting solids.

HENRY A. GARDNER.